Jan. 11, 1955  W. H. OSBORN  2,699,387
METHOD FOR THE TRANSFORMATION OF PULVERULENT SOLIDS
Filed March 30, 1951  4 Sheets-Sheet 1
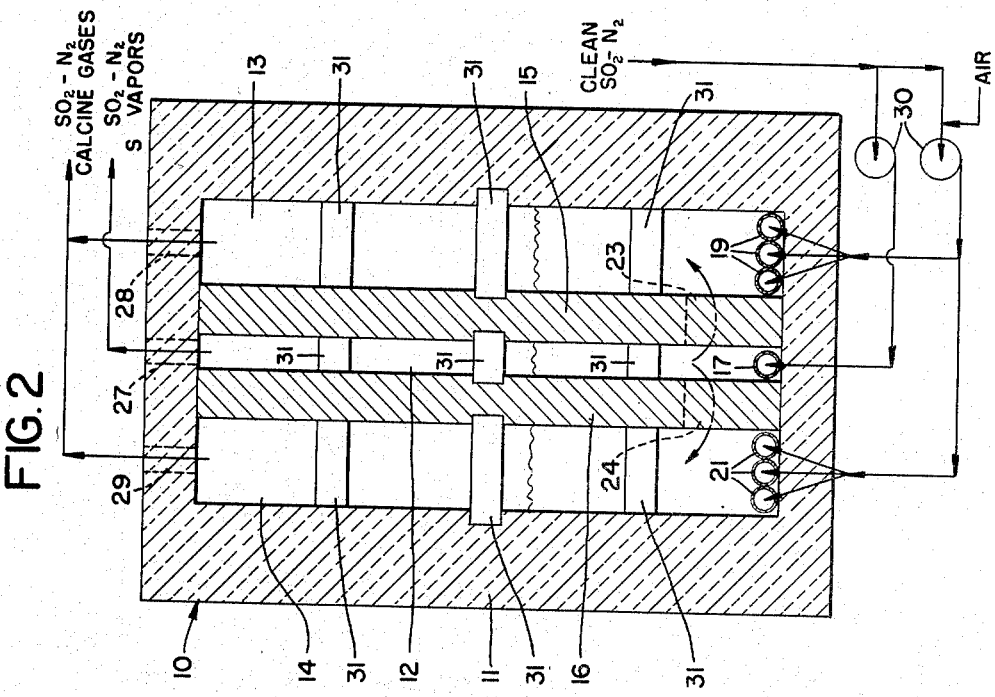
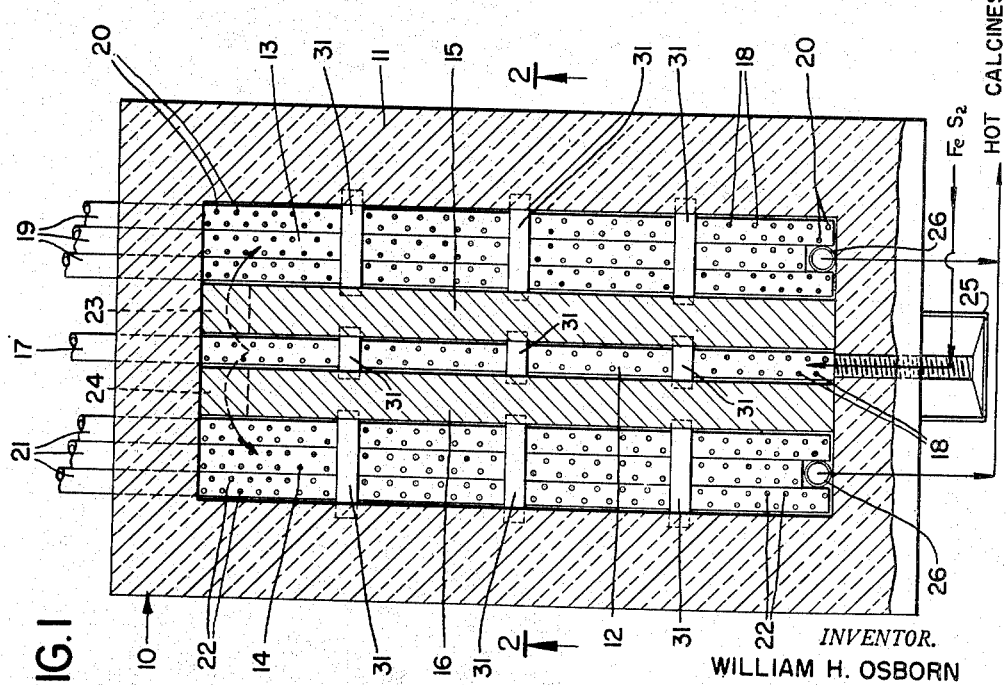
INVENTOR.
WILLIAM H. OSBORN
BY
ATTORNEY

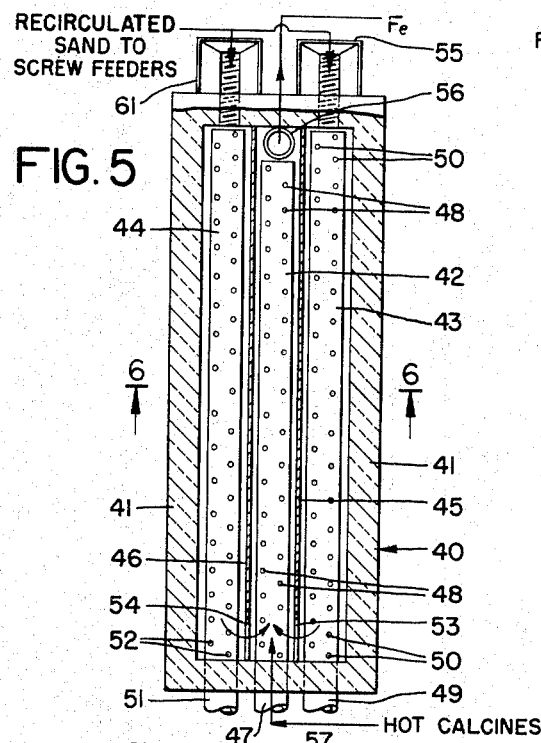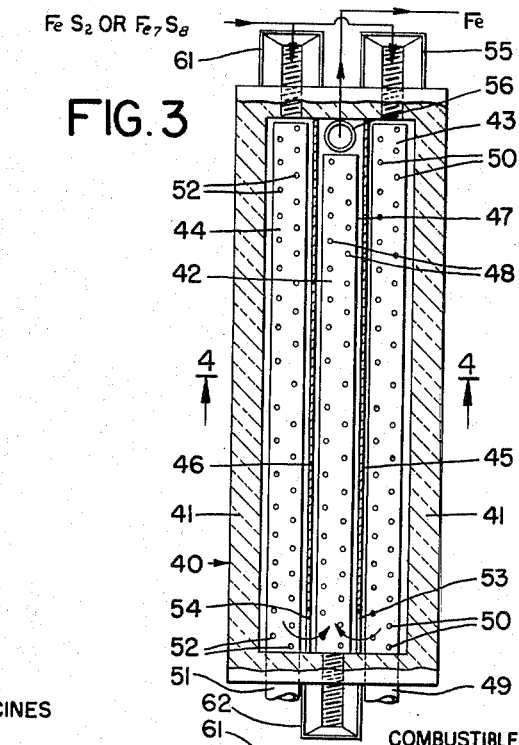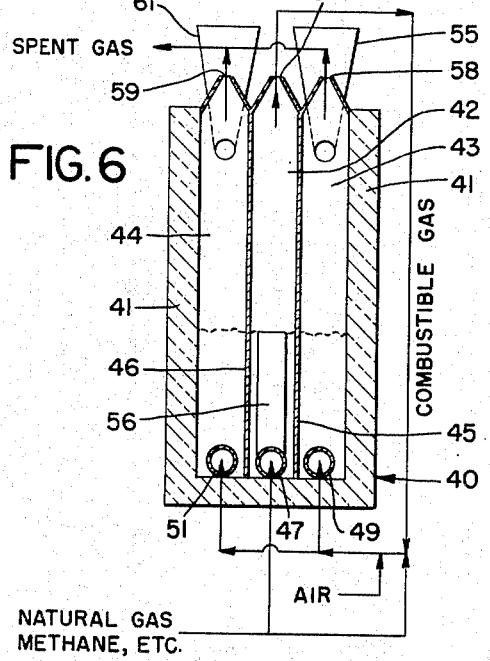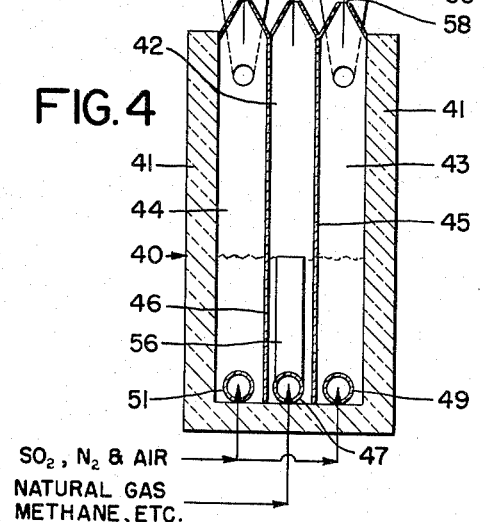

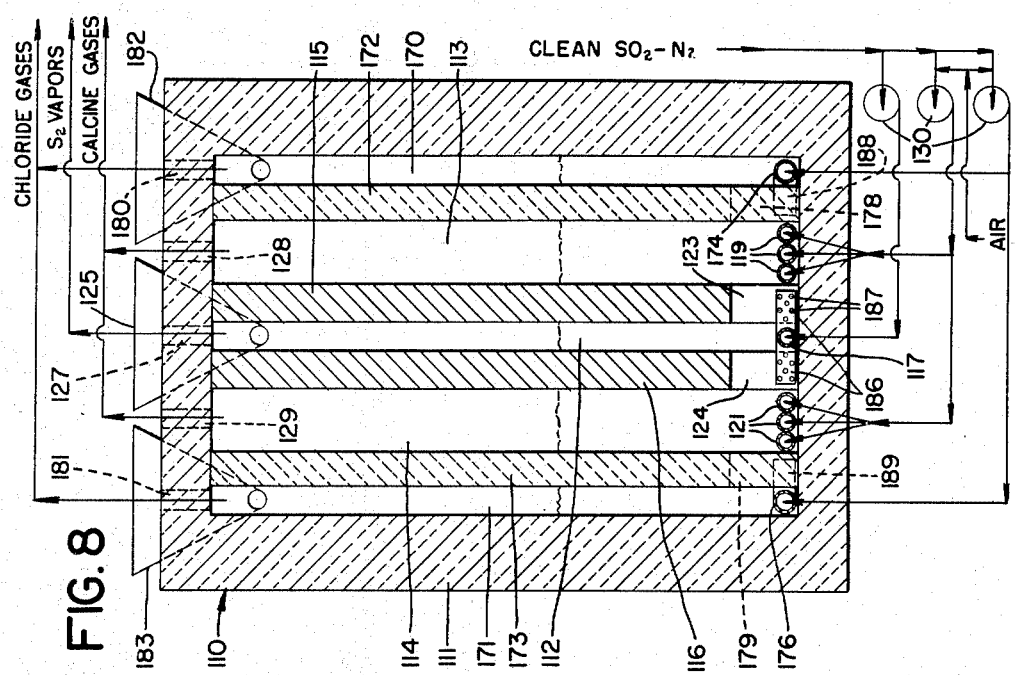

Jan. 11, 1955 W. H. OSBORN 2,699,387
METHOD FOR THE TRANSFORMATION OF PULVERULENT SOLIDS
Filed March 30, 1951 4 Sheets-Sheet 4

INVENTOR.
WILLIAM H. OSBORN
BY
ATTORNEY.

United States Patent Office 2,699,387
Patented Jan. 11, 1955

2,699,387

METHOD FOR THE TRANSFORMATION OF PULVERULENT SOLIDS

William H. Osborn, New York, N. Y., assignor to Phelps Dodge Corporation, New York, N. Y., a corporation of New York Application March 30, 1951, Serial No. 218,460

13 Claims. (Cl. 75—9)

This invention relates to methods and apparatus for the transformation of pulverulent solids.

An object of this invention is to effect the transformation of a pulverulent solid by a gas while removing gaseous products at intermediate stages thereof.

Another object of this invention is to transform pulverulent solids continuously and by the continuous and steady movement of materials both solid and gaseous.

Another object of this invention is to utilize with minimal loss the heat generated in the transformation of a pulverulent solid in an exothermic reaction for effecting an endothermic reaction.

Another object of this invention is to recover profitably useful materials, such as iron oxide, elemental sulfur or sponge iron, from other pulverulent substances, such as pyrite, which are frequently discarded.

Another object of this invention is to maintain a high ratio of heat transfer surface in apparatus of high capacity but of limited size and adapted for utilizing heat generated in an exothermic transformation of a pulverulent solid to effect an endothermic transformation in another pulverulent solid.

In the manufacture or processing of many materials, there are by-products, the utility of which depends upon the economy and efficiency of the methods by which useful products may be obtained from them. Frequently, such by-products are discarded because suitable economical methods are unavailable to render it profitable for securing a useful product from them. For example, in the concentration by flotation of many copper ores, large quantities of pyrites ($FeS_2$) are eliminated by means of selective flotation and sent to tailing dams. While the pyrite in most cases might be easily collected at low cost by a further floating step, no sufficiently satisfactory economical process is available for calcining the pyrite to obtain valuable products from it to warrant such recovery.

In accordance with this invention, processes and apparatus are provided whereby useful materials may be obtained profitably from by-products, such as pyrite, which are frequently discarded because of a lack of available economically feasible processes and apparatus for the recovery of such materials. The processes and apparatus of this invention involve the principle of fluidization, namely the maintenance of a mass of finely divided solids in a state of turbulent suspension by means of an upwardly moving gas stream.

In the processes of this invention, the pulverulent solid is passed in a fluidized state by means of a gas through an elongated horizontal channel to effect the transformation of the solid, and the resulting transformed solid is passed in a fluidized state through another elongated horizontal channel to effect a different transformation in the resulting solid. The heat generated by the transformation in either of the channels is employed to supply a portion or all of the heat required for the transformation in the other channel. One modification of this process involves passing the pulverulent solid in a fluidized state simultaneously through a pair of elongated horizontal channels by means of a gas and passing the combined product of the pair of channels in the fluidized state through a common elongated horizontal channel by means of a gas to effect the same or a further transformation in the combined product. In this modification, the heat generated in the pair of channels or in the common channel is utilized to supply a portion or all of the heat required for the other channel or channels.

An apparatus for practicing the processes of this invention involves a plurality of elongated horizontal channels adjacent each other, means in each adjacent channel for the passage of the material from that channel to its immediately adjacent channel, a heat conducting wall separating each immediately adjacent channel and means for introducing a gas in each of the channels to maintain and move the pulverulent solid in the fluidized state. An opening in the heat conducting wall separating adjacent channels and located at the bottom at one end of a channel is a convenient means for the passage of the material from one channel to its immediately adjacent channel. Again, in some installations in which the passage of some gas from one channel to an adjacent channel through such an opening in the heat conducting wall is undesirable for a particular transformation, an exit pipe may be provided in one channel, the material from that channel collected in a storage bin through such exit pipe and the collected material conveyed by screw conveyor to an adjacent or other channel for further transformation. Means, such as a hopper with screw conveyors, are also provided for supplying the pulverulent solid to be transformed to the first channel in which it is introduced. Other means are also provided in the final elongated horizontal channel or channels through which the material passes for discharging the transformed pulverulent solid after passage through the plurality of channels. The excess gases employed for maintaining and moving the solids through the channels and volatile products resulting from the transformation are removed by any suitable means, such as flues located in the tops of the channels.

The structure of the apparatus of this invention permits the construction of a furnace of high capacity for a particular transformation or transformations in which the ratio of heat surface transfer area to hearth area can be kept at any desired constant. This characteristic of the apparatus of this invention is in marked contrast to furnaces consisting of two or more concentric cylinders. In the latter type of furnace given the same depth of bed, the ratio of heat surface transfer area to hearth area varies inversely with the diameter of the hearth. Consequently, in order to achieve effective heat transfer with the cylindrical type of furnace, it is necessary to employ cylinders of small diameters. This requirement entails an inordinate number of cylinders if high capacities are to be obtained. The apparatus of this invention, on the other hand, is subjected to no such limitations.

The amount of gas employed for maintaining the solid in a fluidized state and for moving the solid through the elongated horizontal channels in the apparatus of this invention is fixed between limits which depend upon the character of the pulverulent material which is to be fluidized, by the dimensions of the channels through which it passes, and by the depth of the bed. If the velocity of the gases is too low, the bed does not fluidize; while if it is too high, excessive amounts of solid are carried out of the apparatus and into the flue as dust. Likewise, the depth of the material in the fluidized bed in the channel is maintained between the practical limits dictated by the principles of solid fluidization. Too shallow a bed is wasteful of space and frequently results in the channeling of the gas through the bed, thereby effecting difficult control and excessive dusting. With too deep a bed, on the other hand, the pressure of the material on the lower portion of the bed becomes excessive and requires more gas to maintain the suspension of the solids. The limits of the depth of the bed, like those of gas flow, are determined by the character, specific gravity and particle size of the materials as well as the magnitude of dusting permissible in a particular transformation. In general, a bed depth of 1½ to 4 or 5 feet is satisfactory for most applications, and a range of 30 inches to 40 inches is ordinarily the optimum limits of the depth of the bed in the elongated channel. The bed depth in each elongated horizontal channel may be regulated by any suitable means, such as weir, dam or discharge orifice set at the height desired.

The activating gas for maintaining and moving the pulverulent solid in a fluidized state in each of the channels is preferably introduced by means of a perforated gas header running along the bottom of each channel. This header desirably has an inside cross-sectional area at least two to ten times greater than the total area of the perforations in the header. While spacing of the perforations in the header may be varied, no particular advantage is found in spacing the perforations closer than 1½ inches and there is some danger of creating dead spots if the spacing is greater than 5 inches. A spacing of 2 to 2½ inches of the perforations is preferred. Desirably the number of perforations is increased, and the spacing between the perforations thereby decreased, in the header located at either end of the channel because at these points more gas is required for adequate fluidization. The diameter or cross-sectional area of the perforations preferably should be such that the pressure drop through them is at least equal to the hydrostatic pressure of the fluidized solid at the bottom of the bed in the channel. Desirably it should be 50 to 100% in excess of this pressure. The object of restricting the perforation area to maintain such pressure is to prevent the flow of solid particles back through the perforation into the header.

To assure maintenance of fluidization of the pulverulent solid in the passage from the discharge end of one channel to the entrance of another channel, a gas may be introduced within the connecting opening. Openings in the heat conducting wall between adjacent channels and located at an end and bottom of each such channels may be provided for the passage of material between them. This construction insures the passage of the pulverulent solid in a fluidized state without being accompanied by an excessively large amount of activating gas or of gaseous products. The size of the openings may be varied over wide limits. In one case 260 pounds of iron pyrite per hour has been calcined in apparatus in which the openings are 4½ inches x 9 inches high. A pipe with perforations in it may be located in the openings or other passage between adjacent channels for supplying the gas to maintain and move the solids in a fluidized state.

The heat conducting walls may be constructed of any suitable material, such as stainless steel, which insures the transmission of heat from one channel to its immediately adjacent channel and which is not affected materially by the solids being transformed or the transformed products. Accordingly, the particular materials employed for the heat conducting walls largely depend upon the solids being treated, the transformed products and the temperatures involved in the transformation. Walls of metallic materials are suitable at temperatures below which their strength is not too seriously affected and under conditions of which they are not too badly corroded by the gases or by the gaseous products involved in the process. In situations in which the use of metals is not feasible, the walls may be constructed of a refractory, such as silicon carbide, which has adequate heat conductivity.

A more comprehensive understanding of this invention is obtained by reference to the accompanying drawing in which:

Fig. 1 is a horizontal section of an embodiment of this invention which is particularly adapted for calcining pyrite, including the distillation of the first atom of sulfur therefrom;

Fig. 2 is a vertical section along the lines 2—2 of the apparatus shown in Fig. 1;

Fig. 3 is a horizontal section of a second embodiment of this invention which is adapted for the production of sponge iron from the calcined product obtained from iron pyrite or other sulfide iron ore;

Fig. 4 is a vertical section along the lines 4—4 of the apparatus shown in Fig. 3;

Fig. 5 is a horizontal section of a third embodiment of this invention which is also adapted for the production of sponge iron from iron pyrite;

Fig. 6 is a vertical section along the lines 6—6 of the apparatus shown in Fig. 5;

Fig. 7 is a horizontal section of a fourth embodiment of this invention which is adapted for the calcining of pyrite and recovery of copper, silver and other metal values which are present in it;

Fig. 8 is a vertical section along the lines 8—8 of the apparatus shown in Fig. 7;

Figures 9, 10:
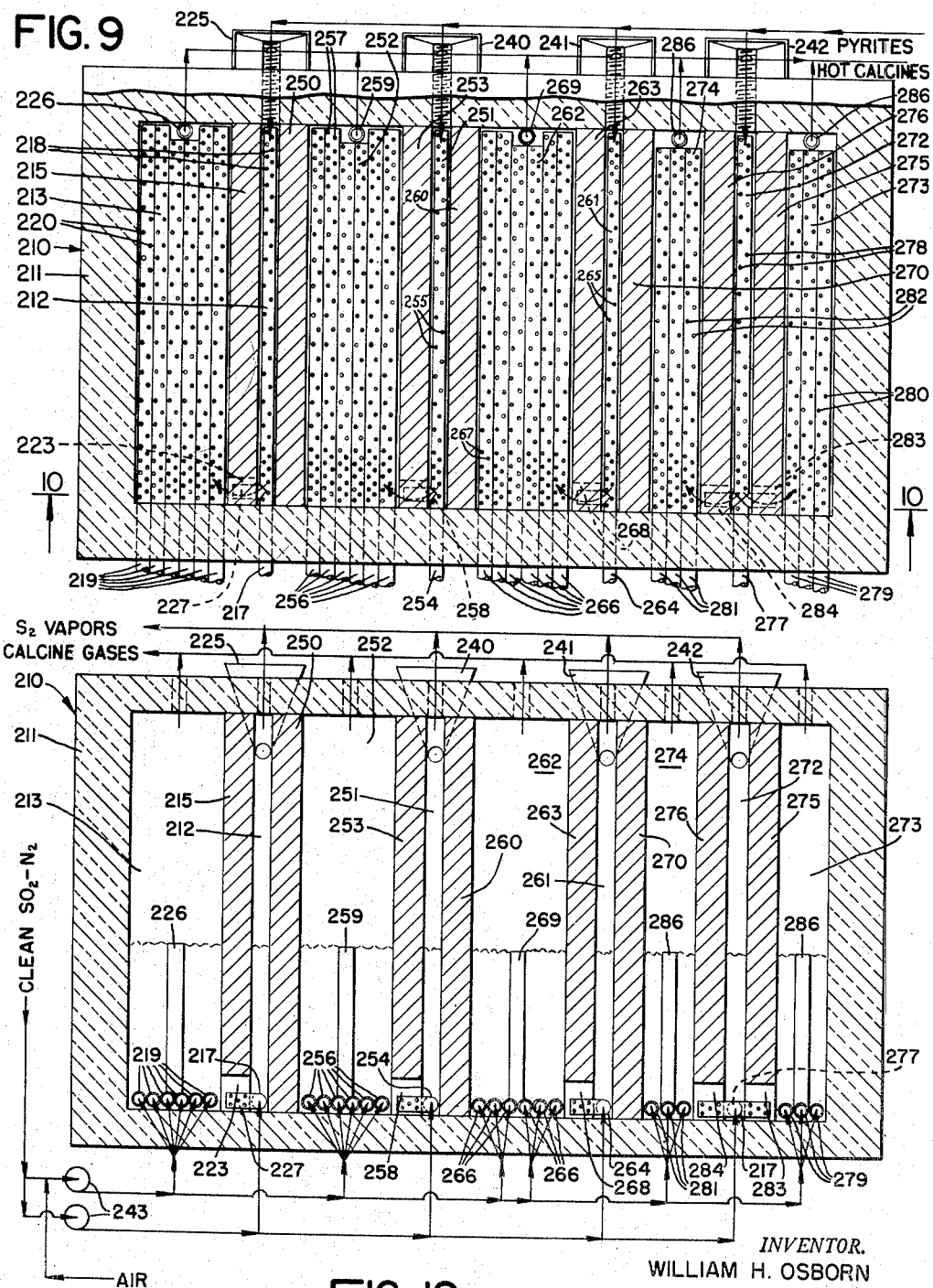
Fig. 9 is a horizontal section of a fifth embodiment of this invention of relatively large capacity adapted for the calcining of pyrite.
Fig. 10 is a vertical section along the lines 10—10 of the apparatus shown in Fig. 9.

In Figs. 1 and 2 a furnace 10, particularly adapted for the calcining of iron pyrite is constructed of heat insulated walls 11 and consists of a central elongated horizontal channel 12 and two side elongated horizontal channels 13 and 14 adjacent each side of the central channel 12. The side channel 13 is separated from the central channel by a heat conducting wall 15, while the side channel 14 is separated from the central channel 12 by a heat conducting wall 16. To maintain the surfaces of the side walls smooth and even in width to withstand the side pressure, it is desirable to brace these walls against the side walls of the furnace 11 and between each other by means of a sufficient number of cross pieces 31. These cross pieces 31 may be of any suitable material which will maintain the separation between the walls and furnace walls under the conditions of operation of the apparatus. For metal walls, the cross pieces may be of relatively small diameter. On the other hand, if the wall is of refractory brick construction, cross pieces as large as standard brick 4½ x 2½ inches may be employed without serious impedance to the material flow of the fluidized solid in the channels 12, 13 and 14. The activating gas in each of the channels is preferably introduced by means of one or more perforated headers running along the bottom of each channel. In Figs. 1 and 2, a header 17 with perforations 18 therein is located at the bottom of the channel 12. A plurality of similar headers 19 with perforations 20 therein are provided in channel 13, while a plurality of similar headers 21 having perforations 22 therein run along the bottom of the channel 14. The size and spacing of the perforations in each of the headers are preferably within the limits heretofore described. A cross-over opening 23 in the heat conducting wall 15 is provided for the passage of the pulverulent solid from channel 12 to channel 13 and a similar cross-over opening 24 is contained in the heat conducting wall 16 to provide a passage for the solids from channel 12 to channel 14. The size of the cross-over openings 23 and 24 may be varied over considerable limits. Cross-over openings of 4½ inches wide x 9 inches deep have been found satisfactory for the calcining of iron pyrite supplied at the rate of 260 pounds per hour to the furnace. The solid pulverulent material is supplied to the channel 12 by any suitable means, such as the screw conveyor 25. The level of the pulverulent solid in the channels 12, 13 and 14 is regulated by adjusting the height of exit pipes 26. The activating gases employed for maintaining and moving the pulverulent solid through the channel 12 and then through either channel 13 or channel 14 are supplied to the headers 17, 19 and 21 by any convenient means. Again, any suitable means, such as exit flues, may be employed for removing and collecting the gases introduced and evolved in the transformation of the solid. In Figs. 1 and 2, exit ports 27, 28 and 29 are provided in the top of channels 12, 13 and 14, respectively, for the removal of gases used in the transformation of the solids. For simplification, the path of the exit gases from the channels 12, 13 and 14 from the exit ports 27, 28 and 29 for a typical installation is indicated in the drawing by the solid lines and arrows. Compressors 30 may be provided for controlling the gases introduced into each of the channels.

As a typical specific example of the practice of this invention and the operation of the furnace shown in Figs. 1 and 2, the treatment of iron pyrites with air for producing sulfur and iron oxide is described. In this process pulverulent pyrite capable of passing through a 40 mesh sieve was fed at a constant rate of 250 pounds per hour by means of the screw conveyor 25 to the channel 12 which was 3 inches wide and 6 feet long in this typical example. Simultaneously a mixture of gas containing about 13.5% of sulfur dioxide and 86.5% nitrogen, which was produced in a later stage of the process, was fed to the header 17 at 10 pounds per square inch pressure and at the rate of 20 cubic feet per minute. When the iron pyrite is introduced into the channel 12 from the screw conveyor 25, it descends immediately into the fluidized material contained in the channel, and thereupon moves in the fluidized state by means of the gas along the length of the channel 12. Throughout its passage through the channel 12, the particles of pyrite receive heat through both heat conducting walls 15 and 16 from heat generating channels 13 and 14. As a result of receiving heat, the iron pyrite is transformed into ferrous sulfide and elemental sulfur, the latter leaving as a vapor with the stream of gases through the exit port 27. The elemental sulfur may be readily recovered from the exit flue gases of the channel 12 by any conventional method. From the channel 12, the transformed solid containing principally ferrous sulfide passes through either cross-over opening 23 to channel 13 or cross-over opening 24 to channel 14 as indicated by the curved arrows in Fig. 1. Both channels 13 and 14 in this installation were 7½ inches wide by 6 feet long. The headers 19 and 21 in channels 13 and 14, respectively, are supplied with air mixed with enough recycled spent gases collected through the exit ports 28 and 29, respectively, to prevent excessive heating of the calcine beds in channels 13 and 14. In one operation of the furnace for this purpose, 3% of sulfur dioxide was carried into the headers 19 and 21 with the balance oxygen and nitrogen and at a rate of 65 cubic feet of the mixed gas per minute in each of the channels 13 and 14. This gas not only activates the ferrous sulfide particles in fluidized condition in the channels 13 and 14 but also supplies the oxygen required to convert the ferrous sulfide into iron oxide and sulfur dioxide. In passing through the fluidized beds of channels 13 and 14, the oxygen introduced through the headers 19 and 21 is substantially completely consumed. The transformation of the ferrous sulfide to iron oxide and sulfur dioxide is an exothermic reaction and causes a rise in temperature of the solids which pass down the length of channels 13 and 14. The greater amount of heat so generated passes through the heat conducting walls 15 and 16 and is sorbed by the solids passing through the channel 12. The spent gases from the channels 13 and 14 are removed from those channels through the exit ports 28 and 29 and combined. The dust in the combined spent gases is removed. A portion of the resulting gases is used for supplying the mixture of nitrogen and sulfur dioxide through header 17 and required for channel 12; another portion is employed for recycling purposes through headers 19 and 21 for the activating gas required for channels 13 and 14; and the remainder may be used for any desired purpose, such as the manufacture of sulfuric acid.

After the pulverulent solid passes through channels 13 and 14, it passes through exit pipes 26 where it is collected in any convenient means.

Two other embodiments of the apparatus of this invention which are particularly adapted for the production of sponge iron are shown in Figs. 3, 4, 5 and 6. The embodiment shown in Figs. 3 and 4 is substantially the same as the embodiment illustrated in Figs. 5 and 6 with the exception of an additional feed provided for the central channel of the apparatus shown in Figs. 3 and 4, and the path of active and spent gases supplied to and recovered from the channels. The same numerals are therefore employed in both embodiments to designate the same parts. A furnace 40 having heat insulating walls 41 contains a central elongated horizontal channel 42 and two side elongated horizontal channels 43 and 44 adjacent each side of the central channel 42. The side channels 43 and 44 are separated from the central channel 42 by heat conducting walls 45 and 46, respectively. Cross pieces, not shown, for bracing the side walls 45 and 46 and to assure the maintenance of the width of each channel uniform throughout its length are provided as in the furnace shown in Figs. 1 and 2. A header 47 with perforations 48 therein is located at the bottom of channel 42. A header 49 with perforations 50 therein and a header 51 with perforations 52 run along the bottoms of channels 43 and 44, respectively. Cross-over openings 53 and 54 in walls 45 and 46, respectively, are provided for passage of material from channels 43 to 42 and from channel 44 to 42. The height of the material being processed in the channels 42, 43 and 44 is regulated by adjusting the height of the exit pipe 56. Exit ports 57, 58 and 59 are provided in the top of channels 42, 43 and 44, respectively, for removing the spent gases from those channels. The paths of the gases supplied to the headers 47, 49 and 51 and those of spent gases passing through the ports 57, 58 and 59 for a typical installation are indicated in Figs. 4 and 6 by solid lines and arrows. Screw conveyors 55 and 61 supply the pulverulent solid to be transformed to the channels 43 and 44, respectively.

In the apparatus shown in Figs. 3 and 4, a screw conveyor 62 is also provided for supplying an additional material to the solid to be transformed in channel 42. This provision in the apparatus permits the addition of material which effects or assists in effecting the transformation of the solid or assists in the recovery of the desired transformed product after passage through the channel 42.

The operation of the apparatus shown in Figs. 3 and 4 is illustrated by the transformation of a sulfide iron ore by calcining to ferrosic or ferric oxides and the subsequent transformation of the oxides to iron metal powder. Pulverulent sulfide iron ore, such as pulverulent iron pyrite ($FeS_2$) or pyrrhotite ($Fe_nS_{n+1}$) is introduced from the screw conveyors 55 and 61 into the channels 43 and 44. A mixture of sulfur dioxide, nitrogen and air is supplied through the headers 49 and 51 to move and maintain the pulverulent solids in those channels in a fluidized state and to effect the complete calcining of the iron sulfide to ferrosic or ferric oxides during its passage through the channels 43 and 44. The completely calcined material passes from the channels 43 and 44 through the cross-overs 53 and 54 to the central channel 42. Reducing gases, such as methane or fabricated gas containing carbon monoxide and hydrogen and generally inert nitrogen, are introduced through the header 47 to the channel 42 to maintain and move the pulverulent solids in a fluidized condition and to effect the reduction of the iron oxide to iron powder. In the production of the iron powder, it is desirable to add to the iron oxide introduced into channel 42 an inert pulverulent solid, such as alumina or silica prior to the passage of the iron oxide along the channel 42. This is accomplished by passing pulverulent silica through the screw conveyor 62 at the same end of channel 42 at which the iron oxide is introduced. The iron oxide during passage through the channel 42 is reduced to iron powder, and the mixture of iron powder and sand pass through the exit pipe 56 from the furnace. The iron powder may be readily separated from the sand by any suitable means, such as by magnetic separation.

When using methane gas as the activating gas in channel 42, the temperature of the gas should be maintained above 1450° F. and under 1750° F. The transformation from the iron oxide to iron powder effected in channel 42 is highly endothermic, and the passage of heat from the calcining operation in the channels 43 and 44 through the heat conducting walls 45 and 46 serves to maintain the reducing reaction in channel 42.

The gases issuing from the reducing operation in channel 42 contain considerable heating values due to the known equilibrium values of $H_2/H_2O$ and $CO/CO_2$ in the presence of iron oxide. The utilization of these heat values is embodied in the apparatus shown in Figs. 5 and 6. When it is desired to distil the first atom of sulfur from pyrite, calcine the resulting ferrous sulfide to ferrosic oxide and reduce this oxide to iron metal powder with methane or reformed reducing gas, it has been found that there is insufficient excess heat in the calcine to furnish the total necessary heat to balance furnace losses, to heat the pyrite to the distillation temperature and to reduce the iron oxide to metallic iron. In the apparatus shown in Figs. 5 and 6, the hot calcine obtained from another apparatus, such as that shown in Figs. 1 and 2 or that illustrated in Figs. 7 and 8 to be later described is introduced at the entrance of channel 42 as indicated by the arrow by any convenient means. One such means is to have the furnace in which the calcining is conducted located above the furnace shown in Figs. 5 and 6 and the exit of the calcining furnace directly above an opening in top of channel 42 at the entrance thereof so that the iron oxide drops into the entrance of channel 42 by gravity. Pulverulent sand or other inert material is fed into the channels 43 and 44 of Figs. 5 and 6 and a mixture of air and the reducing gas from the channel 42 are passed through the headers 49 and 51 in the path indicated by the lines and arrows. In the channels 43 and 44, the gas mixture is burned to provide the heat necessary to maintain the reduction temperature in channel 42. From the channels 43 and 44 the heated sand passes through the cross-over openings 53 or 54 to the entrance of channel 42, at which point the sand mixes with the calcined iron oxide. A reducing gas passes through header 47 to move and maintain the mixture and iron oxide in channel 42 in a fluidized state and to reduce the iron oxide to metallic iron. The mixture of powdered iron and sand is removed from channel 42 by exit pipe 56, and the iron powder may be separated from the sand by any suitable means, such as by magnetic separation of the powdered iron.

The embodiments of the invention shown in Figs. 7 and 8 are adapted for effecting a three-stage transformation, and the utilization of the apparatus shown in Figs. 7 and 8 is illustrated by a description of a three-stage transformation using a pyrite material containing substantial values of metals, such as gold, silver, copper, zinc or lead, the chlorides of which are relatively volatile.

The apparatus shown in Figs. 7 and 8 is similar to that shown in Figs. 1 and 2, except that the apparatus shown in Figs. 7 and 8 has two more channels than that illustrated in Figs. 1 and 2. For simplification, the last two digits in the numeral designation of the parts of the apparatus of Figs. 7 and 8 are the same as the corresponding parts of the apparatus of Figs. 1 and 2.

The furnace 110 of Figs. 7 and 8 is constructed of heat insulated walls 111 and consists of a central elongated horizontal channel 112, two side elongated horizontal channels 113 and 114 adjacent each side of the central channel 112, an outside channel 170 adjacent the side channel 113 and an outside channel 171 adjacent the side channel 114. The side channel 113 is separated from the central channel 112 by a heat conducting wall 115 and from the outside channel 170 by the heat conducting wall 172; while the side channel 114 is separated from the central channel 112 by a heat conducting wall 116 and from the outside channel 171 by a heat conducting wall 173. Cross pieces, not shown, similar to the cross pieces 31 of Figs. 1 and 2 are provided to maintain separation between the heat conducting walls and between the side of the furnace and the heat conducting walls.

A header 117 with perforations therein 118 is located at the bottom of channel 112. A plurality of headers 119 with perforations therein 122 and plurality of headers 121 with perforations therein 122 are run along the bottom of channels 113 and 114, respectively. A header 174 with perforations 175 therein and a header 176 with perforations 177 therein also runs along the bottom of outside channels 170 and 171. Cross-over openings 123 and 124 in walls 115 and 116, respectively, provide passage for materials from central channel 112 to side channel 113 and from central channel 112 to side channel 114, respectively. Cross-over openings 178 and 179 are also provided in the walls 172 and 173, respectively, for the passage of material from channel 113 to channel 170 and from channel 114 to channel 171, respectively. An extension 186 of the header 117 is located in the bottom of cross-over openings 123 and 124. The extension 186 has perforations 187 therein for the passage of gas to facilitate the passage of the material through the cross-over openings 123 and 124. A similar extension 188 of the header 174 and a similar extension 189 of the header 176 are located in the bottoms of cross-over openings 178 and 179, respectively. Exit ports 127, 128, 129, 180 and 181 are provided in the tops of channels 112, 113, 114, 170 and 171, respectively for removing spent gases from those channels. The paths of the gases supplied to the headers 117, 119, 121, 174 and 176 and those of spent gases passing through the exit ports 127, 128, 129, 180 and 181 for a typical installation are indicated in Figs. 7 and 8 by solid lines and arrows. Compressors 130 may be provided for controlling the gases introduced into each of the channels. The solid pulverulent material is supplied to the channel 112 by screw conveyor 125, that to channel 170 by screw conveyor 182 and that to channel 171 by screw conveyor 183. The height of the materials in the channels is maintained by an adjustable exit pipe 184 in channel 170 and an adjustable exit pipe 185 in channel 171.

The operation of the apparatus shown in Figs. 7 and 8 is illustrated by a three-stage transformation using as the starting material pyrite containing substantial values of metals, such as silver and copper, the chlorides of which are volatile. The pulverulent pyrite is introduced by means of screw conveyor 125 into channel 112 and passes through that channel in a fluidized state to lose the first atom of sulfur. From the channel 112, the pulverulent ferrous sulfide containing the other metal values passes through either cross-over openings 123 to channel 113 or cross-over opening 124 to channel 114 as indicated by the curved arrows in Fig. 7. The pulverulent ferrous sulfide passes through channels 113 and 114 in the fluidized state and is controllably calcined to the degree required by the next step. The transformations effected in channels 112, 113 and 114 are the same as those obtained in the typical example described in the illustration of the embodiment of this invention shown in Figs. 1 and 2. The calcine in channels 113 or 114 flows to the end of its channel and then passes through cross-over pieces 178 or 179, respectively, to outside channels 170 or 171, respectively. Air is passed in one typical installation through headers 174 and 176 at the rate of 30 cubic feet of free air per minute at a 10 pound pressure. A chlorine containing salt in pulverulent form, such as an alkaline earth metal chloride (e. g., calcium chloride) or an alkali metal chloride (e. g., sodium chloride) is fed in at the top of the bed by screw conveyors 182 and 183. The calcine and chloride containing salt mix pass through the channels 170 and 171 in a fluidized state. The reaction which takes place in the channels 170 and 171 may be expressed as follows:

$$MS + 2O_2 + CaCl_2 \rightarrow MCl_2\uparrow (volatile) + CaSO_4$$

in which M represents a metal, the chloride of which is volatile, such as gold, silver, copper, zinc or lead.

This reaction is usually only closely balanced thermally, and temperature is maintained against normal heat radiation and conduction losses by the sharing of a common wall with the hot calcine hearths. The volatile metal values in the form of volatile metallic chloride pass through the exit ports 180 and 181, and the metal values are obtained from the metallic chlorides by any convenient means.

In carrying out the step of chloridization, for example, in channels 170 and 171, it has been found that the chlorine containing salt, such as calcium chloride or sodium chloride, may be added slightly before complete calcination of the pyrite, i. e., while the charge still contains up to 3 to 5% sulfur provided conditions in the apparatus as a whole are oxidizing. It has also been found that any free silica present in the charge tends to yield the negative radical required to combine with the alkali metal or alkaline earth metal according to the equation:

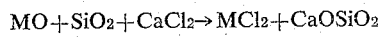
$$MO + SiO_2 + CaCl_2 \rightarrow MCl_2 + CaOSiO_2$$

In cases where free silica is present, it is therefore possible to operate with somewhat less uncalcined sulfur or less sulfur dioxide in the gas stream than where it is absent. It has also been found that the presence of water vapor and to a lesser extent of carbon dioxide is very harmful to the progress of the reaction and greatly reduces the recovery of volatilization of the volatile metal chlorides. Accordingly, if the air which is to be supplied to headers 119 and 121 contains any appreciable moisture or carbon dioxide, it should be removed prior to introduction into the headers.

In Figs. 9 and 10, there is illustrated a furnace of relatively large capacity in which there is nevertheless maintained an adequate heat transfer ratio in the adjacent walls to total hearth area in which the heat is being generated. The furnace 210 consists of a plurality of units, all contained in a heat insulating wall 211, each unit being capable of effecting a two-stage transformation, such as the distillation of the first atom of sulfur as the first stage and the calcination of the resulting ferrous sulfide as the second stage.

The first of the plurality of units consists of a relatively narrow elongated horizontal channel 212 separated by a heat conducting wall 215 from a relatively wide elongated horizontal channel 213, the heat conducting wall 215 having a cross-over opening 223 for the passage of materials from channel 212 to 213. A header 217 with perforations 218 therein runs along the bottom of channel 212, while a plurality of headers 219 with perforations 220 therein are located in the bottom of channel 213. An extension 227 of the header 217 located at the bottom of cross-over opening 223 extends part way through the cross-over opening. Pulverulent material is supplied to the channel 212 by a screw conveyor 225, and after passage through the channels, the material is obtained from an exit pipe 226. The height of the material in the bed is also regulated by the exit pipe 226 which is adjustable. Two other units similar to this first unit are also provided. One of these similar units is adjacent to the first unit and separated from it by a heat conducting wall 250.

It consists of a relatively narrow elongated horizontal channel 251 separated from a relatively wide elongated channel 252 by a heat conducting wall 253. A header 254 with perforations 255 runs along the bottom of channel 251, while a plurality of headers 256, with perforations 257 run along the bottom of channel 252. A cross-over opening 258 is provided for the passage of material from channel 251 to channel 252. An extension of the header 254 extends part way on the bottom of cross-over opening 258. Pulverulent material is supplied to the channel 251 by a screw conveyor 240, and the height of the bed of pulverulent material is regulated by an adjustable exit pipe 259. The other of the similar units is substantially identical and consists of a narrow elongated horizontal channel 261 separated by a heat insulating wall 263 from a relatively wide elongated horizontal channel 262, a cross-over opening 268 in wall 263 for the passage of materials from channel 261 to channel 262, a header 264 with perforations 265 therein at the bottom of channel 261 and at the bottom and part way of cross-over opening 268, a plurality of headers 266 with perforations 267 therein at the bottom of channel 262, a screw conveyor 241 for supplying material to channel 261 and an adjustable exit pipe 269 which also regulates the height of the bed of pulverulent materials in the channels 261 and 262. The channel 262 is separated from channel 251 by a heat insulating wall 260.

Adjacent to channel 261 is another unit similar in arrangement to the furnace shown in Figs. 1 and 2. This unit consists of a central elongated horizontal channel 272, two side elongated horizontal channels 273 and 274 separated from the central channel 272 by heat conducting walls 275 and 276, respectively, cross-over openings 283 and 284 in heat conducting walls 275 and 276, respectively, a header 277 with perforations 278 in the bottom of channel 272 and at the bottom and part way in the cross-over openings 283 and 284, a plurality of headers 279 with perforations 280 in the bottom of channel 273, a plurality of headers 281 with perforations 282 in the bottom of channel 274, exit pipes 286 in channels 273 and 274 for removing the transformed material and for adjusting the height of material in the bed and a screw conveyor 242 for supplying material to channel 272. Channel 274 is separated from channel 261 by a heat conducting wall 270. Cross pieces not shown in the drawing but similar to the cross pieces 31 shown in Figs. 1 and 2 are provided for separating adjacent walls of the channel and the side walls of the furnace from the walls of the adjacent channels. The adoption of the arrangement of the furnaces of Figs. 1 and 2 for the end unit of Figs. 9 and 10 has the advantage over the arrangement of the other units in the furnace of Figs. 9 and 10 for that particular position in providing a double heat conducting surface of walls 275 and 276 to supply the heat required for the transformation in channel 272, which would not be the case if a two channel instead of a three channel unit were used in this end position. In the other positions, however, the two channel unit is preferred since difficulty sometimes arises with the three channel unit in approximately equalizing the amounts of the material supplied to the two side channels from the central channel.

As a typical example of the operation of the furnace shown in Figs. 9 and 10, pulverulent pyrite is introduced into channels 212, 251, 261 and 272 from the respectively associated screw conveyors 225, 240, 241 and 242 of each of those channels as indicated by the solid lines and arrows in the drawings. The pulverulent pyrite is maintained in a fluidized state in these channels by the sulfur dioxide and nitrogen supplied by the path indicated by solid lines and arrows to the headers 217, 254, 264 and 277 in the same manner as described for the furnace shown in Figs. 1 and 2; and the pyrite is transformed in those channels into ferrous sulfide and elemental sulfur. The elemental sulfur passes through exit ports in each of these channels as indicated by solid lines and arrows. The ferrous sulfide then passes to the other channels 213, 252, 262, 273 and 274, supplied through the headers 219, 256, 266, 279 and 281, respectively, with a mixture of sulfur dioxide and nitrogen obtained from the spent gases and air along the path indicated by solid lines and arrows. Compressors 243 are provided to control the rate of flow of gas to the headers. The ferrous sulfide is calcined in channels 213, 252, 262, 273 and 274, and the calcine passes through the exit pipes 226, 259, 269 and 286 to be collected as indicated by the solid lines and arrows in the drawing.

By constructing the furnace as shown in Figs. 9 and 10, an adequate ratio of heat transfer area in adjacent walls to total hearth area may be maintained.

Division having been required by the Patent Office, the claims of this application are directed to process. The apparatus disclosed and described herein is claimed in a copending application Serial No. 431,319, filed May 21, 1954, which is a division of this application.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. The process of producing powdered iron from iron sulfide material which comprises passing pulverulent iron sulfide material in a fluidized state by means of a gas containing oxygen through a first elongated horizontal channel to effect the substantial complete calcining of the iron sulfide material to iron oxide, passing the resulting pulverulent solid in a fluidized state by means of a reducing gas through an adjacent elongated horizontal channel separated from said first channel by a heat conducting wall to convert the iron oxide to metallic iron and utilizing the heat generated in said first channel to be conducted through said heat conducting wall to assist in effecting the transformation effected in said adjacent channel.

2. The process of producing powdered iron from iron sulfide material which comprises passing pulverulent iron pyrite in a fluidized state by means of a gas through a pair of elongated horizontal channels to effect the substantial complete calcining of iron sulfide material to iron oxide, mixing the resulting product from both channels with an inert pulverulent solid, passing the resulting mixture in a fluidized state by means of a reducing gas through an adjacent channel adjacent to each of said pair of channels to convert said iron oxide to metallic iron and utilizing the heat generated in said pair of channels to assist in effecting the transformation in said central channel.

3. The process of producing powdered iron from calcined iron oxide which comprises passing a pulverulent inert solid in a fluidized state by means of a gas through a pair of elongated horizontal channels, combining said inert solid after passage through either of said channels, mixing the combined inert solid with pulverulent calcined iron oxide, passing the resulting mixture in a fluidized state by means of a reducing gas through a central channel adjacent to each of said pair of channels to convert the iron oxide to metallic iron and utilizing the spent gases from said central channel and air to maintain and move said pulverulent inert solid in a fluidized state in said pair of channels, to supply heat to said pulverulent inert solid and to assist in effecting the transformation in said central channel.

4. In the process of obtaining metal values in the calcining of iron pyrite, the steps comprising mixing pulverulent calcined iron pyrite with a pulverulent chloride selected from the class consisting of alkali metal chlorides and alkaline earth metal chlorides, passing the mixture in a fluidized state by means of a gas in the substantial absence of water through an elongated horizontal channel to effect the recovery of said metal values in the form of their chlorides and utilizing the heat generated in the calcining of the pyrite to supply the heat required for converting said metals to their chlorides and for volatilizing the resulting chlorides.

5. The process of calcining iron pyrite comprising passing pulverulent iron pyrite in a fluidized state by means of a substantially oxygen free gas through a central elongated horizontal channel to substantially completely remove the first atom of sulfur therefrom, passing the resulting pulverulent solid in a fluidized state by means of an oxygen-containing gas through a first pair of elongated horizontal channels adjacent said central channel to transform said resulting pulverulent solid to iron oxide, mixing the iron oxide with a pulverulent chloride selected from the class consisting of alkali metal chlorides and alkaline earth metal chlorides, passing the mixture in a fluidized state by means of a gas in the substantial absence of water through a second pair of elongated horizontal channels adjacent said first pair of channels to effect the recovery of metal values other than iron contained in the pyrite in the form of the chloride of said metal values and utilizing the heat generated in said first pair of elongated channels to assist in effecting the transformations in said central channel and said second pair of channels.

6. The process of producing iron powder from iron oxide which comprises passing a charge, containing said iron oxide in finely divided form, through a horizontal elongate channel adjacent another channel separated from said first-mentioned channel by a heat conducting wall; maintaining said charge as it passes through said first-mentioned channel in fluidized state by passing upwardly into said charge a reducing gas which reacts endothermically with said iron oxide to form iron powder and a residual gas containing combustible constituents; passing said residual gas from said first-mentioned channel to said second-mentioned channel with sufficient air to burn said combustible constituents; burning said residual gas and thereby evolving heat in said second-mentioned channel; causing sufficient heat to pass through said heat conducting wall into said charge to maintain the temperature of the charge passing through said first-mentioned channel at a temperature sufficient to effect said endothermic reduction reaction and reduce said iron oxide to iron powder as it passes in fluidized state through said first-mentioned channel.

7. The process of producing iron powder from calcined iron oxide which comprises passing a charge, containing said iron oxide in finely divided form and an inert pulverulent solid, through a central elongate horizontal channel flanked on each side by a channel separated from said central channel on each side thereof by a heat conducting wall; maintaining said charge as it passes through said first-mentioned channel in fluidized state by passing upwardly into said charge a gas which is predominantly methane in sufficient amount to react endothermically with said iron oxide to reduce it to iron powder, said reaction forming a gas containing carbon monoxide and hydrogen; passing a part of said formed gas from said central channel to one of said flanking channels and a part of said formed gas to the other of said flanking channels with sufficient air to burn said formed gas; burning said formed gas and thereby evolving heat in said flanking channels; causing sufficient heat to pass through said conducting walls into said charge to maintain the temperature of the charge as it passes in fluidized state through said central channel at a temperature sufficient to effect said endothermic reduction reaction and reduce the said iron oxide to iron powder as it passes through said central channel.

8. The process of producing iron powder from iron oxide which comprises passing a charge, containing said iron oxide in finely divided form and an inert pulverulent solid in the form of a continuously moving fluidized bed, through a central elongate horizontal channel flanked on each side by a channel separated from said central channel on each side thereof by a heat conducting wall; maintaining said bed as it passes through said central channel in fluidized state by passing upwardly into said bed a gas which is predominantly methane in sufficient amount to react endothermically with the iron oxide in said bed to reduce it to iron powder, said reaction forming a gas containing carbon monoxide and hydrogen; passing a part of said gas formed in said central channel to one of said flanking channels and a part of said gas formed in said central channel to the other of said flanking channels with sufficient air to burn said formed gas; burning said formed gas and thereby evolving heat in said flanking channels; causing heat evolved from said formed gas to pass through said heat conducting walls into said charge to supply sufficient heat to said charge to maintain the temperature of the charge passing through said central channel between about 1450° F. and 1750° F. thereby to effect said endothermic reduction reaction and reduce the said iron oxide in said moving fluidized bed to iron powder as it passes through said central channel.

9. The process of transforming the chemical form of a pulverulent solid which comprises passing the pulverulent solid as a moving fluidized bed successively through a first and a second of two adjacent elongated horizontal channels separated from each other by a heat conducting wall, the bed of solid in said first channel being fluidized by passing a first gas upwardly through said bed from the bottom in a multiplicity of streams distributed along the length of said first elongated channel which causes said bed to flow in fluidized state through said first channel, said first gas being active to transform the chemical form of said solid, the bed of solid in said second channel being fluidized by passing a second gas upwardly through said bed from the bottom in a multiplicity of streams distributed along the length of said second elongated channel which causes said bed to flow in fluidized state through said second channel, the gas introduced into the bed in one of said channels reacting with the solid in that channel exothermically thereby forming heat which passes through said heat conducting wall into the bed in the other channel to effect transformation of the solid in said other channel.

10. The process of transforming the chemical form of a pulverulent solid which comprises passing the pulverulent solid as moving fluidized beds simultaneously through a pair of two parallel elongated horizontal channels separated from each other by a third elongate horizontal channel having heat conducting walls, combining the moving fluidized beds from said pair of channels and passing the combined beds in fluidized state through said central channel, the beds of solid in said pair of channels being fluidized by passing a first gas upwardly through said beds from the bottom in a multiplicity of streams distributed along the lengths of said pair of elongated channels which causes said beds to flow through said pair of channels, said first gas being active to transform the chemical form of said solid, the combined bed of solid in said central channel being fluidized by passing a second gas upwardly through said central channel bed from the bottom in a multiplicity of streams distributed along the length of said central elongated channel which causes said combined bed to flow through said central channel, the gas introduced into the beds in said pair of channels reacting with the solid in said pair of channels exothermically thereby forming heat which passes through said heat conducting walls into the bed in the central channel to effect transformation of the solid in said central channel.

11. The process of transforming the chemical form of a pulverulent solid which comprises passing the pulverulent solid as a moving fluidized bed having a depth of 1½ to 5 feet successively through a first and a second of two adjacent elongated horizontal channels separated from each other by a heat conducting wall, the bed of solid being maintained at a depth of 1½ to 5 feet by continuously introducing the pulverulent solid into said first channel and being fluidized by passing a first gas upwardly through said bed from the bottom in a multiplicity of streams distributed along the length of said first elongated channel which causes said bed to flow in fluidized state through said first channel, said first gas being active to transform the chemical form of said solid, the bed of solid in said second channel being fluidized by passing a second gas upwardly through said bed from the bottom in a multiplicity of streams distributed along the length of said second elongated channel which causes said bed to flow in fluidized state through said second channel, the gas introduced into the bed in one of said channels reacting with the solid in that channel exothermically thereby forming heat which passes through said heat conducting wall into the bed in the other channel to effect transformation of the solid in said other channel.

12. The process of calcining iron pyrite which comprises passing pulverulent iron pyrite as a moving fluidized bed successively through a first and a second of two adjacent elongated horizontal channels separated from each other by a heat conducting wall, the bed of solid in said first channel being fluidized by passing a substantially oxygen free gas upwardly through said bed from the bottom in a multiplicity of streams distributed along the length of said first elongated channel which causes said bed to flow in fluidized state through said first channel and causes removal from said pyrite of the first atom of sulphur therefrom, the bed of solid in said second channel being fluidized by passing a second gas containing a substantial amount of oxygen upwardly through said bed from the bottom in a multiplicity of streams distributed along the length of said second elongated channel which causes said bed to flow in fluidized state through said second channel, and causing an exothermic reaction which converts said iron sulphide resulting from the reaction in said first channel to iron oxide and transferring heat resulting from said exothermic reaction through said heat conducting wall into the bed in the other channel to effect the transformation of the solid in said other channel.

13. In a process for producing iron powder from iron oxide in a plurality of adjacent elongate horizontal channels separated from each other by heat conducting walls the steps comprising passing a charge of the iron oxide in finely divided form through at least one of the horizontal elongate channels, maintaining the iron oxide as it passes through the elongate horizontal channel in a fluidized state by passing upwardly into said charge a gas which reduces the iron oxide into iron by endothermic reactions and which produces a gas containing combustible constituents, passing said gas containing combustible constituents into at least one elongate horizontal channel adjacent the channel in which the iron oxide is reduced, burning it therein and evolving heat, passing the heat through the heat conducting wall which separates the channel in which the gas containing the combustible constituents is burned from the channel in which the iron oxide is reduced and thereby utilizing the heat produced by burning the gas containing the combustible constituents to heat and maintain the reducing gas and iron oxide at a temperature necessary for reduction of the iron oxide to iron.

References Cited in the file of this patent
UNITED STATES PATENTS

| Number | Name | Date |
|---|---|---|
| 171,812 | Hunter | Jan. 4, 1876 |
| 866,580 | Davis | Sept. 17, 1907 |
| 1,264,832 | McDonald | Apr. 30, 1918 |
| 1,939,033 | Bacon et al. | Dec. 12, 1933 |
| 1,941,592 | Bacon et al. | Jan. 2, 1934 |
| 2,030,021 | Ingraham | Feb. 4, 1936 |
| 2,295,039 | Hodson et al. | Sept. 8, 1942 |
| 2,478,912 | Garbo | Aug. 16, 1949 |
| 2,481,217 | Hemminger | Sept. 6, 1949 |
| 2,503,788 | White | Apr. 11, 1950 |
| 2,511,813 | Lockwood | June 13, 1950 |